US 9,043,239 B2

(12) United States Patent
Kayanuma et al.

(10) Patent No.: US 9,043,239 B2
(45) Date of Patent: May 26, 2015

(54) SECURITIES TRADING SYSTEM AND DEVICE

(71) Applicants: KABUSHIKI KAISHA TOSHIBA, Minato-ku (JP); TOSHIBA SOLUTIONS CORPORATION, Minato-ku (JP)

(72) Inventors: Eiji Kayanuma, Tokyo (JP); Hiroshi Arai, Tokyo (JP); Kentaro Hatada, Tokyo (JP); Nobuyoshi Usami, Tokyo (JP); Tomohiro Kurihara, Tokyo (JP); Haruo Satou, Tokyo (JP)

(73) Assignees: KABUSHIKI KAISHA TOSHIBA, Minato-ku (JP); TOSHIBA SOLUTIONS CORPORATION, Minato-ku (JP)

( * ) Notice: Subject to any disclaimer, the term of this patent is extended or adjusted under 35 U.S.C. 154(b) by 0 days.

(21) Appl. No.: 13/771,631

(22) Filed: Feb. 20, 2013

(65) Prior Publication Data

US 2013/0159163 A1  Jun. 20, 2013

Related U.S. Application Data

(63) Continuation of application No. PCT/JP2011/057392, filed on Mar. 25, 2011.

(30) Foreign Application Priority Data

Aug. 20, 2010  (JP) .................. 2010-185537

(51) Int. Cl.
*G06Q 40/00* (2012.01)
*G06Q 40/04* (2012.01)
*G06Q 40/06* (2012.01)

(52) U.S. Cl.
CPC .............. *G06Q 40/04* (2013.01); *G06Q 40/06* (2013.01); *G06Q 40/00* (2013.01)

(58) Field of Classification Search
CPC ........ G06Q 40/04; G06Q 40/00; G06Q 40/06

USPC .................................................. 705/37, 36 R
See application file for complete search history.

(56) References Cited

U.S. PATENT DOCUMENTS 5,267,148 A * 11/1993 Kosaka et al. .................. 705/37
7,752,123 B2   7/2010 Brookfield et al.
(Continued)

FOREIGN PATENT DOCUMENTS

JP  2005-135214 A  5/2005
JP     4330719 B2  6/2009
JP  2009-535702   10/2009

OTHER PUBLICATIONS

Duerden, A. (2008). DAVOS: Microsoft financial services managing director—partnerships large and small—david vander, worldwide managing director of microsoft financial services, tells alan duerden of the work his firm has undertaken in the payments arena with large finan. The Banker, , 1. Retrieved Jan. 21, 2015.*

(Continued)

*Primary Examiner* — Kito R Robinson
(74) *Attorney, Agent, or Firm* — Oblon, McClelland, Maier & Neustadt, L.L.P.

(57) ABSTRACT

According to one embodiment, a securities trading system comprises a plurality of order sharing devices and a plurality of ordering devices. The order sharing device sends each telegram to the ordering device of a master system and the order sharing device of a slave system. The order sharing device sends each of the telegrams to the ordering device of the slave system to switch from the slave system to the master system when a failure is detected in the ordering device of the master system. The ordering device calculates statistics from market information, and uses the statistics to judge whether to permit the placement of an order with the stock exchange apparatus in the case of the master system.

5 Claims, 9 Drawing Sheets

(56) References Cited

U.S. PATENT DOCUMENTS

| | | | |
|---|---|---|---|
| 8,781,946 B2* | 7/2014 | Mintz et al. | 705/37 |
| 2001/0042033 A1 | 11/2001 | Sposito | |
| 2002/0091606 A1* | 7/2002 | Shapiro | 705/36 |
| 2002/0184373 A1* | 12/2002 | Maes | 709/228 |
| 2004/0167840 A1 | 8/2004 | Tully et al. | |
| 2005/0044197 A1* | 2/2005 | Lai | 709/223 |
| 2008/0015970 A1* | 1/2008 | Brookfield et al. | 705/37 |
| 2008/0059846 A1 | 3/2008 | Rosenthal et al. | |
| 2009/0112775 A1* | 4/2009 | Chiulli et al. | 705/36 R |
| 2011/0238554 A1* | 9/2011 | Tarlow | 705/37 |

OTHER PUBLICATIONS

International Search Report issued on Apr. 26, 2011 for PCT/JP2011/057392 filed on Mar. 25, 2011 with English translation.

International Written Opinion issued on Apr. 26, 2011 for PCT/JP2011/057392 filed on Mar. 25, 2011.

Hwang, Jeong-Hyon et al. "High-Availability Algorithms for Distributed Stream Processing." Proceedings of the 21$^{st}$ IEEE International Conference on Data Engineering (ICDE 2005), Apr. 5, 2005, pp. 779-790. <DOI: 10.1109/ICDE.2005.72>, fig. 1.

International Preliminary Report on Patentability and Written Opinion issued Mar. 28, 2013, in International application No. PCT/JP2011/057392 (English translation only).

* cited by examiner

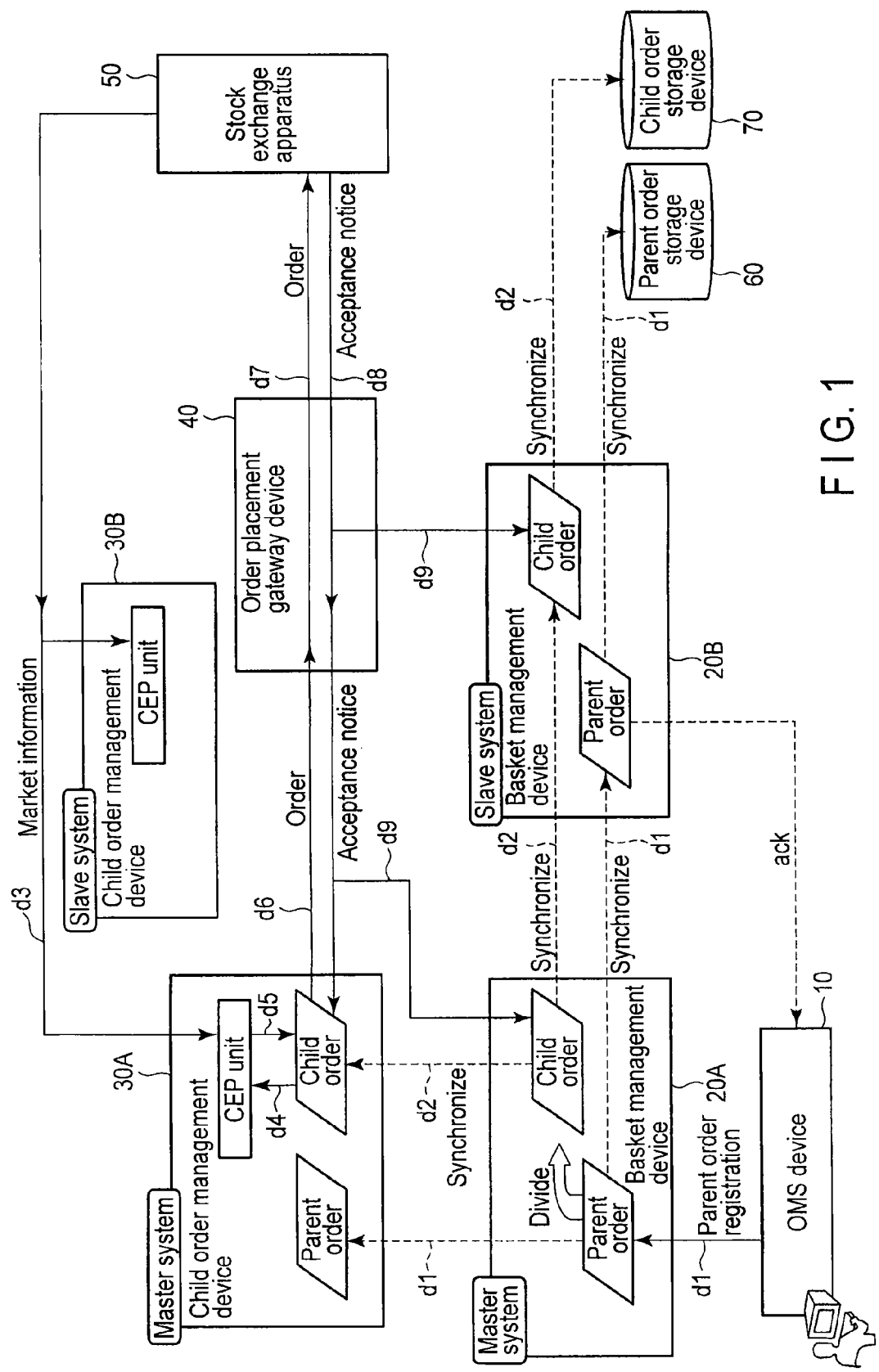
F I G. 1

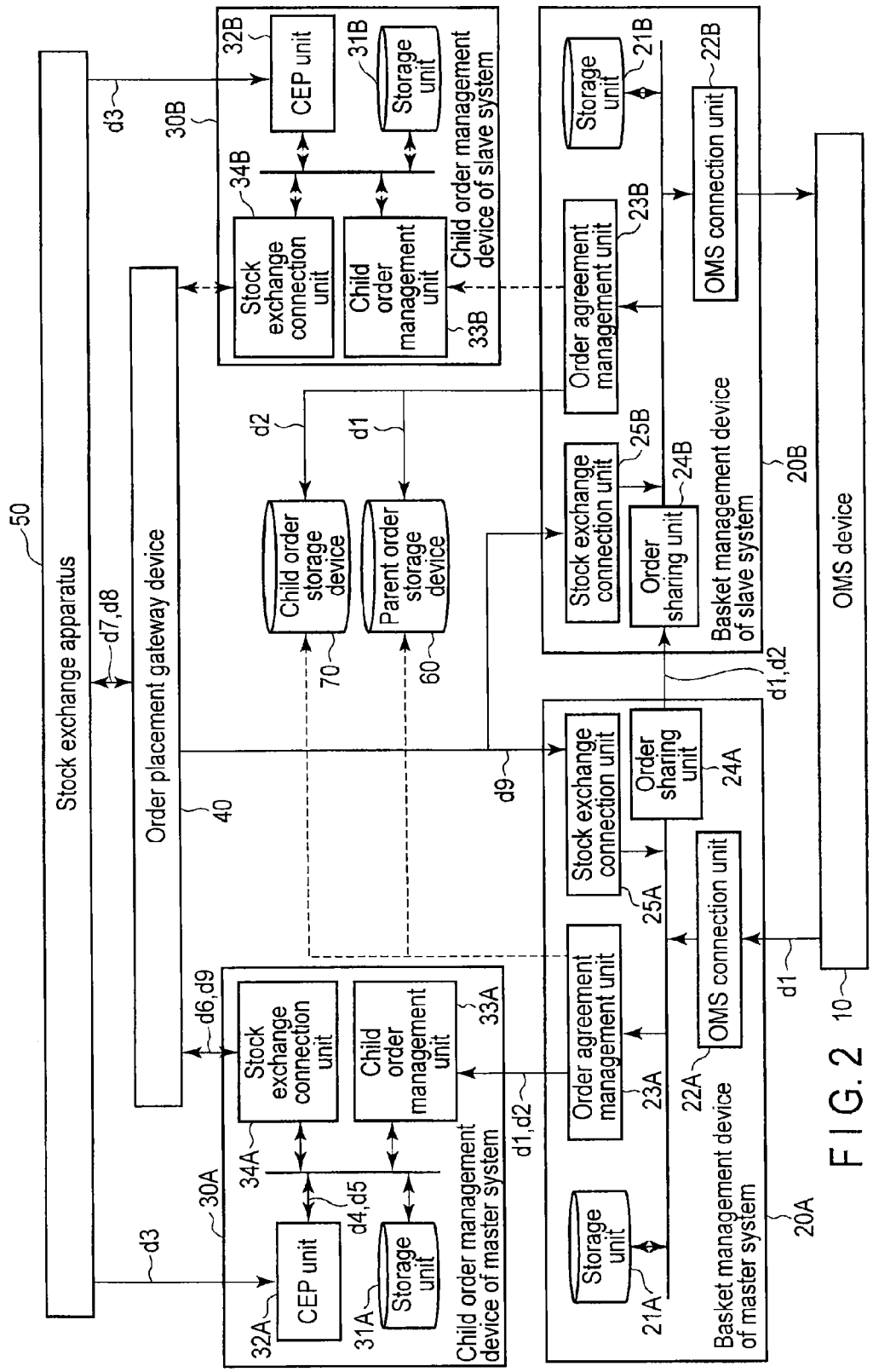
F I G. 2 d1

| Parent order ID | Brand code | Sale/purchase | Quantity | Algorithm number | Algorithm parameter |
|---|---|---|---|---|---|
| 000001 | 6502 | 1: sell | 10000 | 1: VWAP | Variable item |

FIG. 3 d2

| Child order ID | Parent order ID | Scheduled time | Order telegram |
|---|---|---|---|
| 000001 | 000001 | 09:00:00 | Format of stock exchange (quantity, price, and execution conditions are undecided) |

FIG. 4 d3

| Time | Brand code | Current value | Turnover | Asked price | Asked quantity | Bid price | Bid quantity |
|---|---|---|---|---|---|---|---|
| 09:00:01.234 | 6502 | 450 | 11000 | 451 | 1000 | 448 | 1000 |

FIG. 5 d4

| Child order ID | Brand code | Sale/ purchase | Price condition | Quantity | Execution condition | Algorithm number | Algorithm parameter |
|---|---|---|---|---|---|---|---|
| 000001 | 6502 | 1: sell | 1: asked price | 1000 | 0: none | 1: VWAP | Time: 09 : 00 : 00 |
| 000002 | 6501 | 2: purchase | 0 : current value | 2000 | 4: closing | 2: trigger | Current value<336 |

FIG. 6 d5

| Trigger classification | Time | Child order ID | Brand code | Sale/ purchase | Price | Quantity | Execution condition |
|---|---|---|---|---|---|---|---|
| 1: time | 09 : 00 : 00.000 | 000001 | 6502 | 1: sell | 447 | 1000 | 0: none |
| 2: market | 09 : 00 : 01.234 | 000002 | 6501 | 2: purchase | 335 | 2000 | 4: closing |

FIG. 7 d6

| Order placement gateway header | Order telegram (new, correct, or cancel) |
|---|---|
| | Format of stock exchange (quantity, price, and execution conditions are already set) |

FIG. 8

| d7 | |
|---|---|
| Stock exchange header | Order telegram (new, correct, or cancel) |
| | Format of stock exchange (quantity, price, and execution conditions are already set) |

FIG. 9

| d8 | |
|---|---|
| Stock exchange header | Acceptance notice (new, correct, or cancel) |
| | Format of stock exchange |

FIG. 10

| d9 | |
|---|---|
| Order placement gateway header | Acceptance notice (new, correct, or cancel) / agreement notice / lapse notice |
| | Format of stock exchange |

FIG. 11

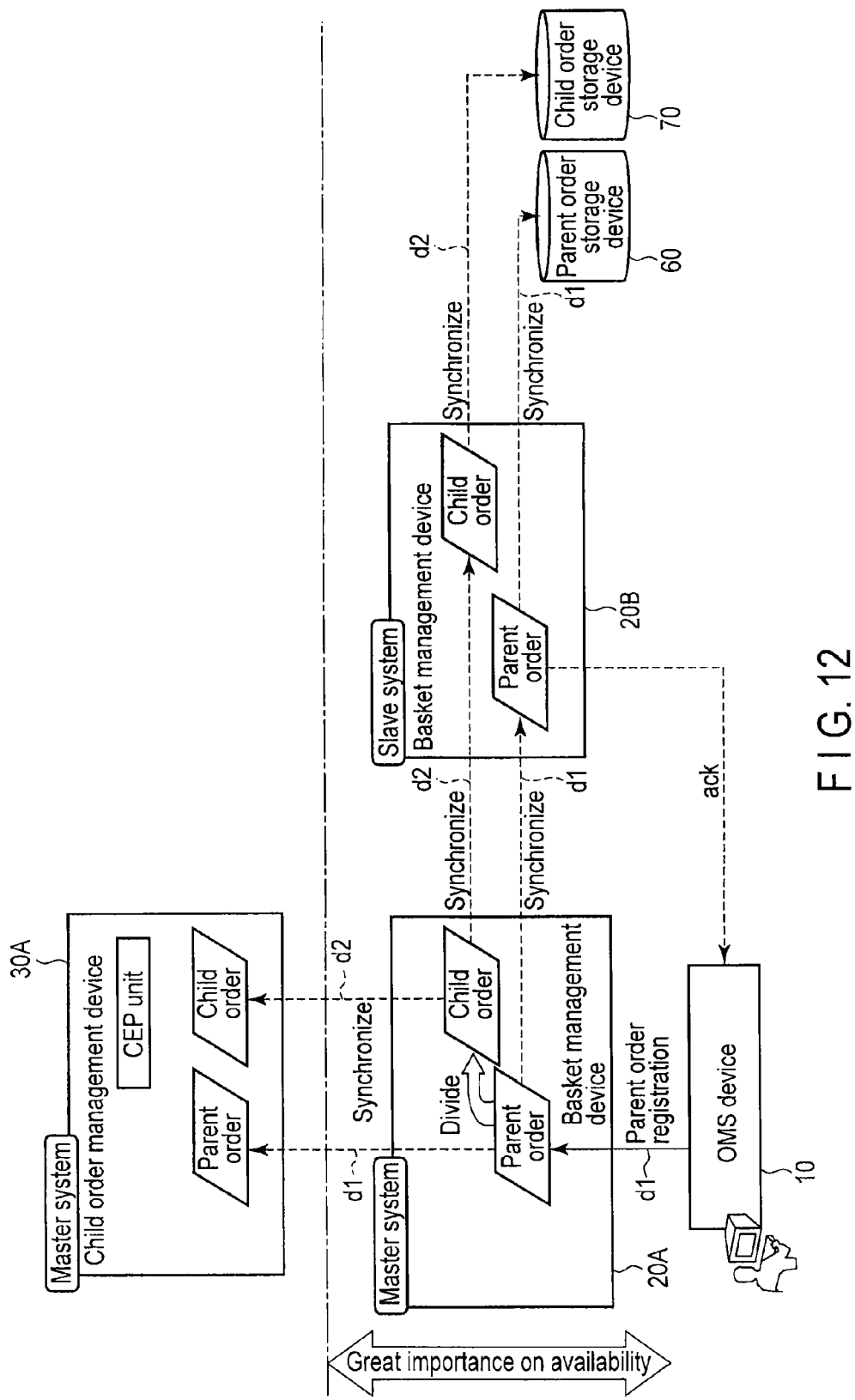
F I G. 12

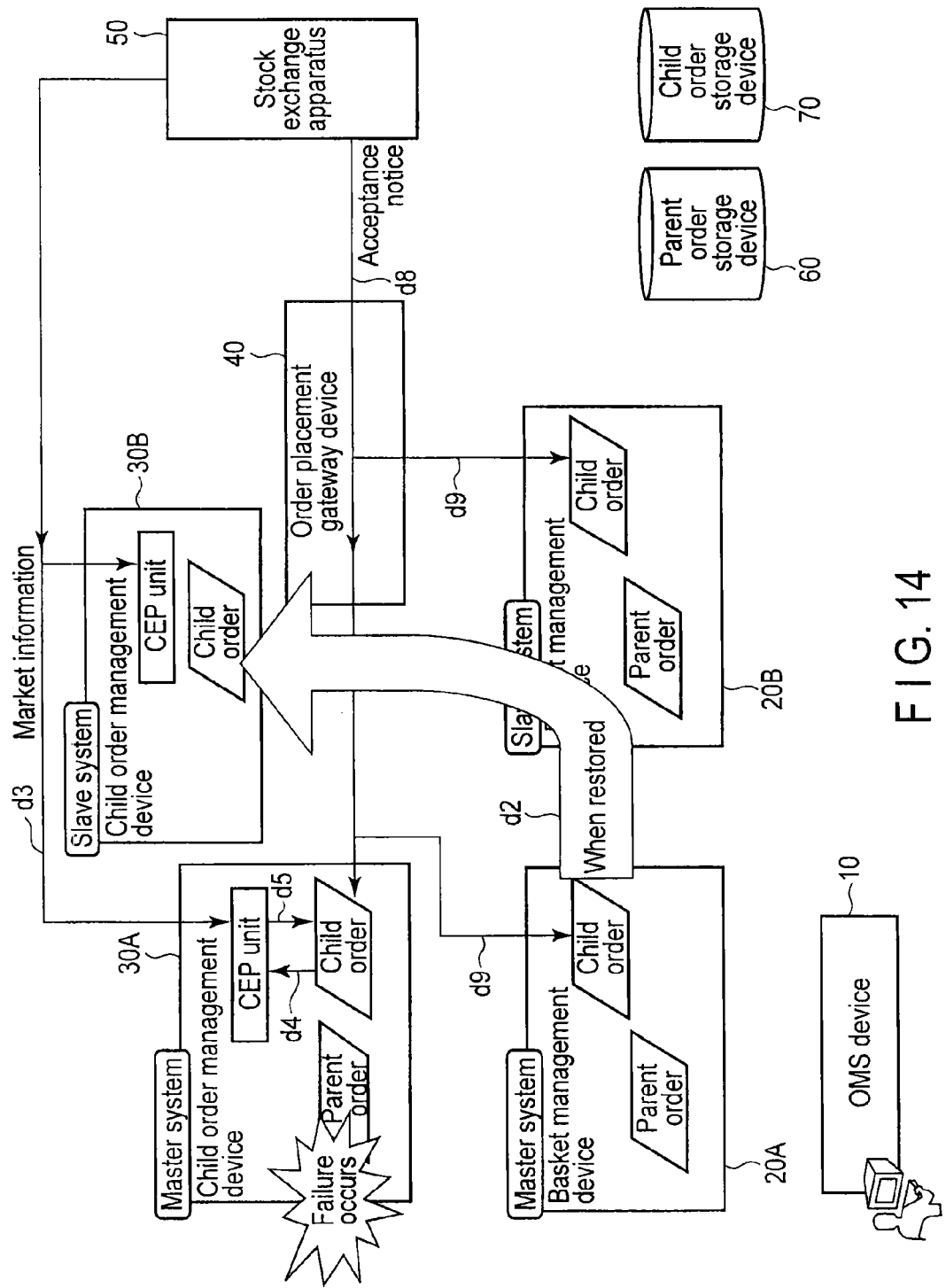
F I G. 14

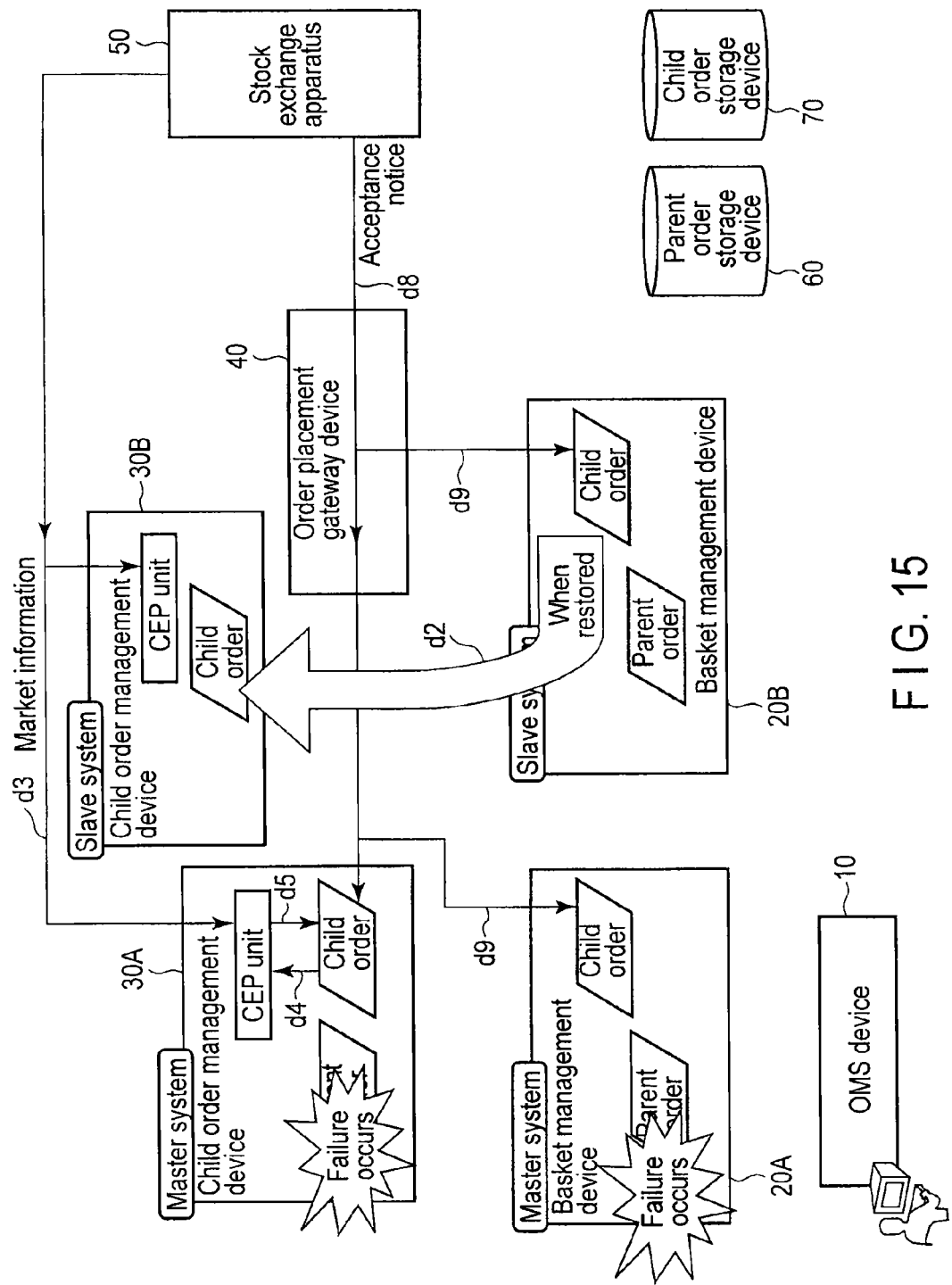
F I G. 15

SECURITIES TRADING SYSTEM AND DEVICE

CROSS REFERENCE TO RELATED APPLICATIONS

This application is a Continuation application of PCT Application No. PCT/JP2011/057392, filed Mar. 25, 2011 and based upon and claiming the benefit of priority from prior Japanese Patent Application No. 2010-185537, filed Aug. 20, 2010, the entire contents of all of which are incorporated herein by reference.

FIELD

Embodiments described herein relate generally to a securities trading system and a device.

BACKGROUND

A conventional automatic securities trading system (hereinafter referred to as a securities trading system) uses a method which is integrated with a manual order management system (hereinafter also referred to as an OMS) and which hard-codes an algorithm as a program code.

The securities trading system of this type mainly performs target ordering to receive market news and place an order when a target price is reached, or performs volume weight average price (VWAP) ordering to divide an order and place the order at a scheduled order time.

However, the conventional securities trading system uses the same foundation for the market news reception and order function as the OMS. Accordingly, the OMS intervenes in order placement processing, and order telegrams are created in the OMS. Therefore, an agreement may be disadvantageously made at an unfavorable price due to low response performance from the reception of the market news to order placement.

As the conventional securities trading system uses the method that hard-codes the algorithm, the system makes a judgment by a simple AND/OR condition of, for example, the current price, which makes corrections or changes to the algorithm difficult. Therefore, the disadvantage of the conventional system is that packaging of an algorithm expected by a trader is difficult.

Another disadvantage of the conventional securities trading system is that the addition of an algorithm function and the scale-out in the case of increased orders (slice numbers) are difficult.

On the other hand, recently, a large number of vendors have been selling algorithm trade products with an improved securities trading algorithm to eliminate the above-mentioned disadvantages.

The above-mentioned algorithm trade products have, however, no problem in general. Meanwhile, according to the examination by the present inventor, high-speed performance deteriorates if importance is placed on recovery (availability) during failures, and availability deteriorates if importance is placed on high-speed performance.

Therefore, it is considered that the above-mentioned algorithm trade products are not suitable for a system such as the securities trading system that requires both availability (mission critical) and high-speed performance (low latency).

A problem to be solved by the present invention is to provide a securities trading system and a device which enable both availability and high-speed performance in securities trading.

BRIEF DESCRIPTION OF THE DRAWINGS

FIG. 1 is a schematic diagram showing a general configuration of a securities trading system according to an embodiment;

FIG. 2 is a functional block diagram showing a configuration example of the system according to the embodiment;

FIG. 3 is a schematic diagram showing an example of a parent order registration telegram according to the embodiment;

FIG. 4 is a schematic diagram showing an example of a child order telegram according to the embodiment;

FIG. 5 is a schematic diagram showing an example of market information according to the embodiment;

FIG. 6 is a schematic diagram showing an example of a trigger set according to the embodiment;

FIG. 7 is a schematic diagram showing an example of an order placement trigger according to the embodiment;

FIG. 8 is a schematic diagram showing an example of an order telegram (order placement gateway) according to the embodiment;

FIG. 9 is a schematic diagram showing an example of an order telegram (stock exchange) according to the embodiment;

FIG. 10 is a schematic diagram showing an example of an acceptance notice (stock exchange) according to the embodiment;

FIG. 11 is a schematic diagram showing an example of an acceptance notice/agreement notice (order placement gateway) according to the embodiment;

FIG. 12 is a schematic diagram illustrating the operation of sharing a child order according to the embodiment;

FIG. 14 is a schematic diagram illustrating an example of a recovery operation according to the embodiment; and FIG. 15 is a schematic diagram illustrating another example of the recovery operation according to the embodiment.

DETAILED DESCRIPTION

Figure 13:
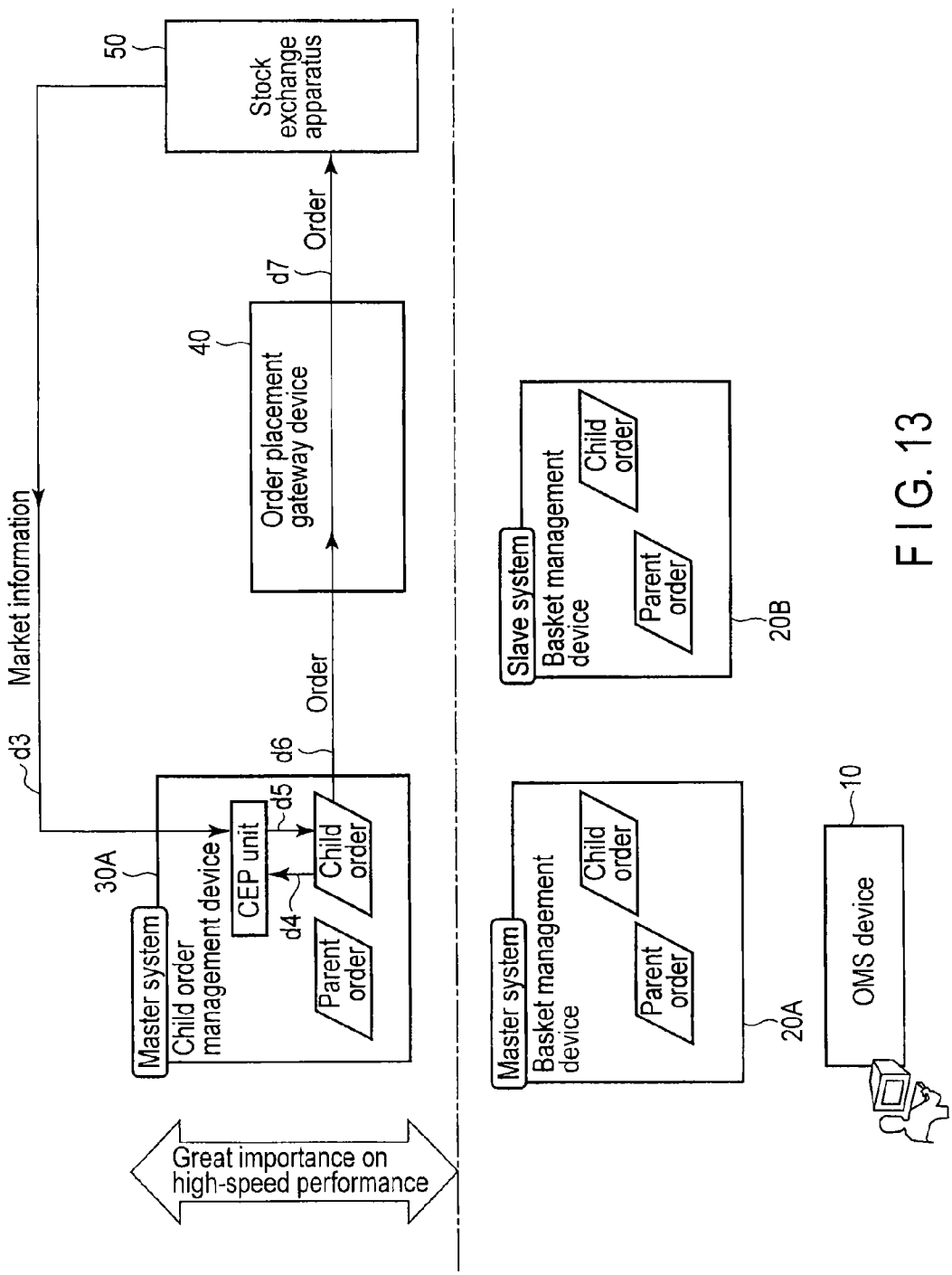
FIG. 13 is a schematic diagram illustrating an order placement operation according to the embodiment.

In general, according to one embodiment, a securities trading system comprises a plurality of order sharing devices and a plurality of ordering devices which are configured to communicate with each other. The order sharing devices are switchable between a master system and a slave system and have a first storage unit. The ordering devices are switchable between a master system and a slave system and have a second storage unit.

The order sharing device according to the embodiment writes, into the first storage unit, a parent order registration telegram received from a parent order registration device.

Child order creating module of the order sharing device according to the embodiment writes, into the first storage unit, a child order telegram created from the parent order registration telegram.

Order sharing device according to the embodiment sends each telegram in the first storage unit to the ordering device of the master system and the order sharing device of the slave system.

Switch module of the order sharing device according to the embodiment sends each of the telegrams to the ordering device of the slave system to switch from the slave system to the master system when a failure is detected in the ordering device of the master system.

In the ordering device according to the embodiment, the parent order registration telegram and the child order telegram are stored in the second storage unit in the case of the master system.

The ordering device according to the embodiment writes each of the sent telegrams into the second storage unit.

Each of the ordering devices according to the embodiment calculates statistics from market information received from a stock exchange apparatus.

Judging module of each of the ordering devices according to the embodiment uses the statistics to judge whether to permit the placement of an order with the stock exchange apparatus in the case of the master system.

Hereinafter, an embodiment of the present invention will be described with reference to the drawings. Each device described below can be embodied by a hardware configuration or a combinational configuration of hardware resources and software. A program used as the software of the combinational configuration is previously installed in a computer of a corresponding device from a network or a storage medium, and enables the function of the corresponding device.

FIG. 1 is a schematic diagram showing a general configuration of a securities trading system according to an embodiment. FIG. 2 is a functional block diagram showing a configuration example of the system. FIG. 3 to FIG. 11 are schematic diagrams showing examples of information such as telegrams in the system.

As shown in FIG. 1 and FIG. 2, this securities trading system comprises a plurality of basket management devices (order sharing devices) 20A and 20B which can communicate with a manual order management system (OMS) device 10 and which are switchable between a master system and a slave system, and a plurality of child order management devices (order placement devices) 30A and 30B which can communicate with the basket management devices 20A and 20B and a stock exchange apparatus 50 and which are switchable between a master system and a slave system. This securities trading system further comprises an order placement gateway device 40, a parent order storage device 60, and a child order storage device 70. However, the devices 40, 60, and 70 may be omitted as long as at least both availability and high-speed performance in securities trading have only to be achieved. The basket management devices 20A and 20B may otherwise be referred to as basket management server devices 20A and 20B. Similarly, the child order management devices 30A and 30B may otherwise be referred to as child order management server devices 30A and 30B or order management server devices 30A and 30B. When it is necessary to specify a master system or a slave system in the following explanation, one of the basket devices 20A and 20B that has a suffix A is the master system (normal system, operating system, hot system), and one that has a suffix B is the slave system (waiting system, standby system), for convenience. The relation between the suffixes A and B and between the master system and the slave system also applies to the child order management devices 30A and 30B.

Here, the OMS device 10 has the function of a normal manual order management system including the function as the parent order registration device. For example, the OMS device 10 has the function of sending, to the basket management device 20A of the master system, a parent order registration telegram d1 created in response to the operation of a user such as a trader or a dealer, and the function of receiving an acknowledgment ACK of the parent order registration telegram d1 from the basket management device 20B of the slave system.

In addition, the order management system (OMS) is a system that manages general order placement, and there are an order placement client terminal (OMS device 10), a back system, and an order placement gateway as subsystems of the OMS. The OMS is independent of the management devices 20A, 20B, 30A, 30B, 60, and 70 according to the present embodiment. The OMS alone is completed as a manual order placement system. For the basket management device 20A of the master system, the OMS serves as an input unit of the parent order registration telegram d1 including a parent order and an algorithm (classification and parameter specifications).

The basket management devices 20A and 20B respectively comprise storage units 21A and 21B, OMS connection units 22A and 22B, order agreement management units 23A and 23B, order sharing units 24A and 24B, and stock exchange connection units 25A and 25B.

The storage units (first storage units) 21A and 21B are storage devices which can be read/written by the units 22A to 25A and 22B to 25B. For example, the parent order registration telegram d1 and a child order telegram d2 are stored in the storage units 21A and 21B.

Here, as shown in FIG. 3, the parent order registration telegram d1 includes a parent order ID for identifying a parent order, a brand code for identifying the brand of a security, sale/purchase indicating whether the security is sold/purchased, quantity indicating the quantity of sold/purchased securities, an algorithm number for identifying an algorithm used for algorithm trades, and an algorithm parameter used for the identified algorithm.

As shown in FIG. 4, the child order telegram d2 includes a child order ID for identifying a child order obtained by dividing the parent order of the parent order registration telegram d1, a parent order ID for identifying the parent order as the origin of the child order, a scheduled time indicating the scheduled time of the child order, an acceptance notice reception flag (not shown), and an order telegram (stock exchange format: quantity, price, and execution conditions are undecided) for indicating the child order to the stock exchange. The order telegram in this child order telegram d2 may be referred to as an order telegram model in view of the contents described below.

The order telegram (model) in the child order telegram d2 is created in accordance with a format of the stock exchange to which the stock exchange apparatus 50 belongs. In the format of the stock exchange to which the stock exchange apparatus 50 belongs, the same data as the data in the parent order registration telegram d1 are already set, and order placement contents specific to the child order are unset. That is, the order telegram (model) in the child order telegram d2 is previously created in the format of the stock exchange, and necessary information (the order placement contents specific to the child order) alone is set later. Thus, the high-speed performance of order placement is improved (high-speed response is possible at the placement of an order as a result of the previous creation of the high-load telegram).

The OMS connection units 22A and 22B are interfaces for connecting the communication between each of the basket management devices 20A and 20B and the OMS device 10, and have, for example, the following functions (f22-1) to (f22-2):

(f22-1) A function of writing the parent order registration telegram d1 received from the OMS device 10 into the storage units 21A and 21B in the case of the master system.

(f22-2) A function of returning the acknowledgment ACK of the parent order registration telegram to the OMS device 10 at the completion of the writing of the parent order registration telegram d1 and the child order telegram d2 into the storage units 21A and 21B and the external order storage devices 60 and 70 in the case of the slave system.

The order agreement management units 23A and 23B have, for example, the following functions (f23-1) to (f23-6):

(f23-1) A child order creating function of creating the child order telegram d2 for placing an order by dividing the sale/purchase and the quantity in the parent order registration telegram d1 written in the storage units 21A and 21B, and writing the child order telegram d2 into the storage units 21A and 21B in the case of the master system.

Here, the child order creating function (f23-1) may include, for example, the following two functions (f23-1-1) and (f23-1-2):

(f23-1-1) A function of uniquely creating the child order ID to be included in the child order telegram d2 during the creation of the child order telegram d2.

(f23-1-2) A function of creating an order telegram to be included in the child order telegram d2 in accordance with a format of a stock exchange to which the stock exchange apparatus 50 belongs so that the sections of the quantity, the price, and the execution conditions are left blank, during the creation of the child order telegram d2.

(f23-2) A function of sending the parent order registration telegram d1 and the child order telegram d2 written in the storage units 21A and 21B to the child order management device 30A of the master system, in the case of the master system.

(f23-3) A switch function of sending the parent order registration telegram d1 and the child order telegram d2 in the storage units 21A and 21B to the child order management device 30B of the slave system to switch the child order management device 30B of the slave system to the master system when a failure is detected in the child order management device 30A of the master system in the case of the master system. In addition, a failure is detected, for example, when a reception completion notice responsive to the sending of the parent order registration telegram d1 and the child order telegram d2 is not received or when a failure detection signal is received from unshown failure detection means, and the failure detection method is not limited.

Here, the switch function may include a function of sending, to the child order management device 30B of the slave system, the child order telegram d2 in which an acceptance notice reception flag is not set, and the parent order registration telegram d1 including the parent order ID in the child order telegram d2, out of the parent order registration telegram d1 and the child order telegram d2 in the storage units 21A and 21B.

(f23-4) A function of writing, into the storage unit 21B and the external order storage devices 60 and 70, the parent order registration telegram d1 and the child order telegram d2 received from the basket management device 20A of the master system in the case of the slave system.

(f23-5) A function of retrieving the child order telegram d2 including the child order ID from the storage units 21A and 21B and then setting the acceptance notice reception flag in the child order telegram d2 when receiving an acceptance notice d9 including the child order ID from the stock exchange apparatus 50 via the order placement gateway device 40 and the stock exchange connection units 25A and 25B.

(f23-6) A function of also retrieving the child order telegram d2 including the child order ID from the external child order storage device 70 and then setting the acceptance notice reception flag in the child order telegram d2 when receiving an acceptance notice d9 including the child order ID from the stock exchange apparatus 50 via the order placement gateway device 40 and the stock exchange connection units 25A and 25B, in the case of the slave system.

The order sharing units 24A and 24B have a function of sending, to the basket management devices 20B and 20A of the slave system, the parent order registration telegram d1 and the child order telegram d2 written in the storage units 21A and 21B, for example, in the case of the master system.

The stock exchange connection units 25A and 25B are interfaces for connecting the communication between each of the basket management devices 20A and 20B and the stock exchange apparatus 50, and have, for example, a function of sending the acceptance notice d9 to the order agreement management units 23A and 23B when receiving the acceptance notice d9 including the child order ID from the stock exchange apparatus 50 via the order placement gateway device 40.

In addition, of the basket management devices 20A and 20B, the basket management device 20A of the master system divides one parent order into one to n child orders. A combination of parent orders is referred to as a basket.

The child order management devices 30A and 30B respectively comprise storage units 31A and 31B, complex event processing (CEP) units 32A and 32B, child order management units 33A and 33B, and stock exchange connection units 34A and 34B.

The storage units (second storage units) 31A and 31B are storage devices which can be read/written by the units 32A to 34A and 32B to 34B. For example, the parent order registration telegram d1 and the child order telegram d2 are stored in the storage units 31A and 31B in the case of the master system.

The CEP units 32A and 32B have, for example, the following functions (f32-1) to (f32-3):

(f32-1) A function of receiving market information d3 from the stock exchange apparatus 50, and calculating statistics in accordance with the market information d3.

Here, for example, as shown in FIG. 5, the market information d3 includes a time indicating the time of the market, a brand code for identifying the brand of a security, a current value indicating the current price of the security, a volume indicating the turnover of the security, an asked price indicating the estimated selling price of the security, an asked quantity indicating the estimated selling quantity of the securities, a bid price indicating the estimated purchase price of a security, and a bid quantity indicating the estimated purchase quantity of the securities. The market information d3 of this type can be received from a system such as FLEX of Tokyo Stock Exchange.

As the statistics, for example, relative strength index (RSI) can be properly used. The RSI is a numerical rate of a rise to past price movements, and is calculated as indicated by the following equation:

RSI=the sum of rises within a given period÷(the sum of rises within a given period+the sum of falls within a given period)×100[%].

However, the statistics is not limited to the RSI, and any value that can be calculated on the basis of the market information is applicable.

(f32-2) A function of judging whether to place an order (whether to permit the placement of an order) with the stock exchange apparatus 50 in accordance with the calculated statistics in the case of the master system. As the judging function (f32-2), a function may be provided to judge whether to place an order (whether to permit the placement of an order) with the stock exchange apparatus 50 in accordance with whether the calculated statistics and a trigger set d4 which is sent from the child order management unit 33A in the case of the master system correspond to the market information.

Here, the trigger set d4 indicates the conditions to permit the order placement. As shown in FIG. 6, the trigger set d4 includes a child order ID for identifying a child order, a brand code for identifying the brand of a security, sale/purchase indicating whether a security is sold/purchased, a price condition indicating whether to sell at an asked price, purchase at a bid price, or purchase at a current value, quantity indicating the quantity of securities trading, an execution condition indicating, for example, whether to trade at the closing time, an algorithm number for identifying an algorithm used for algorithm trades, and an algorithm parameter used for the identified algorithm.

(f32-3) A function of creating a child order ID and an order placement trigger d5 including order placement contents specific to the child order in accordance with the market information used in the judgment by the judging function (f32-2) and the trigger set d4, and sending the order placement trigger d5 to the child order management unit 33A in the case of the master system, when an order is placed (when order placement is permitted) as a result of the judgment by the judging function (f32-2).

Here, as shown in FIG. 7, the order placement trigger d5 includes a trigger classification indicating a time or a market price, a time indicating the time of the placement of an order, a child order ID for identifying a child order, a brand code for identifying the brand of a security, sale/purchase indicating whether a security is sold/purchased, a price indicating the price of a security, quantity indicating the quantity of securities trading, and an execution condition indicating, for example, whether to trade at the closing time. The order placement contents specific to the child order correspond to the price, the quantity, and the execution condition. The trigger set d4 and the order placement trigger d5 include a small amount of information, and can therefore reduce the amount of data processed in a program and improve the high-speed response of order placement.

The child order management units 33A and 33B have, for example, the following functions (f33-1) to (f33-3):

(f33-1) A function of writing the parent order registration telegram d1 and the child order telegram d2 into the storage units 31A and 31B when receiving the parent order registration telegram d1 and the child order telegram d2 from the basket management device 20A of the master system.

(f33-2) A function of creating the trigger set d4 that indicates conditions to permit the order placement as shown in FIG. 6 in accordance with the parent order registration telegram d1 and the child order telegram d2 in the storage units 31A and 31B, and sending this trigger set d4 to the CEP units 32A and 32B, in the case of the master system.

(f33-3) A function of setting, in the child order telegram d2, the order placement contents (quantity, price, and execution condition) (specific to the child order) included in the order placement trigger d5 sent from the CEP units 32A and 32B, and then creating an order telegram d6.

Here, as shown in FIG. 8, the order telegram d6 includes an order placement gateway header including a destination address of the order placement gateway device 40, and an order telegram (stock exchange format: quantity, price, and execution conditions are already set) for indicating a child order (new, correct, or cancel) to the stock exchange.

The stock exchange connection units 34A and 34B are interfaces for connecting each of the child order management devices 30A and 30B and the stock exchange apparatus 50, and have, for example, the following functions (f34-1) and (f34-2):

(f34-1) A function of sending the order telegram d6 created by the child order management units 33A and 33B to the stock exchange apparatus 50 via the order placement gateway device 40.

(f34-2) A function of writing the acceptance notice d9 into the storage units 31A and 31B when receiving the acceptance notice d9 including a child order ID from the stock exchange apparatus 50 via the order placement gateway device 40.

Here, the child order management devices 30A and 30B are additionally explained.

The child order management device 30A of the master system holds a child order in the storage unit 31A. The child order is expanded in the storage unit 31A without the change of the stock exchange format. In response to the order placement trigger d5 sent from the CEP unit 32A, the child order management unit 33A only sets the price, the quantity, and the execution conditions included in the order placement trigger d5 to create the final order telegram d6. The child order telegram d2 in the stock exchange format is previously created to reduce the latency from the reception of the order placement trigger d5 to the sending of the order telegram d6. Moreover, the CEP unit (CEP server) 32A for event judgment is disposed in the same case (the CEP unit 32A can be disposed in a separate case, but should be put in the same case to reduce the latency). The CEP unit 32A holds therein an algorithm for controlling order placement opportunities and the child order ID. The CEP unit 32A uses the market information (containing other composite input information) as input information to judge order placement by the algorithm. When there is a child order that satisfies order placement conditions, the CEP unit 32A sends the order placement trigger d5 to the child order management unit (child order management server) 33A.

The term complex event processing (CEP) means a method that can process constantly collected market information in a short time, and has been recently drawing attention. The CEP is suited to real-time processing for complex judgments as in the system for stock algorithm trading, for example, "immediately purchasing a stock C when the price of a stock A has increased by 1% within the preceding five minutes and the price of a stock B has dropped by 0.5%".

The order placement gateway device 40 is a gateway for connecting the network of each of the management devices 20A, 20B, 30A and, 30B and the network of the stock exchange apparatus 50, and has, for example, the following functions (f40-1) and (f40-2):

(f40-1) A function of creating an order telegram d7 addressed to the stock exchange apparatus 50 from the order telegram d6 received from the child order management device 30A of the master system, and sending the order telegram d7 to the stock exchange apparatus 50.

Here, as shown in FIG. 9, in the order telegram d7, the order placement gateway header of the order telegram d6 is replaced by a stock exchange header (header information including a destination address of the stock exchange apparatus 50).

(f40-2) A function of creating, from an acceptance notice d8 received from the stock exchange apparatus 50, the acceptance notice d9 transmitted from the order placement gateway device 40, and sending the acceptance notice d9 to the child order management device 30A of the master system and the basket management devices 20A and 20B.

Here, as shown in FIG. 10, the acceptance notice d8 to be received includes a stock exchange header that includes a transmission source address of the stock exchange apparatus 50, and an acceptance notice (new, correct, or cancel) written in accordance with the stock exchange format.

As shown in FIG. 11, in the acceptance notice d9 to be transmitted, the stock exchange header of the acceptance notice d9 is replaced by the order placement gateway header (header information including a transmission source address of the order placement gateway device 40). Instead of the acceptance notice d9, an agreement notice or a lapse notice may be used.

Here, the order placement gateway device 40 is additionally explained.

The order placement gateway device 40 sends an order to the stock exchange, and has a function of converting a communication protocol of a securities company and a communication protocol of the stock exchange, and maintaining a session (the maintenance of a condition in which all lines are normal).

The stock exchange apparatus 50 is a computer for executing the functions of the stock exchange. For example, the stock exchange apparatus 50 has a function of sending the market information d3 to the child order management devices 30A and 30B, and a function of trading securities in accordance with the order telegram d7 received from the order placement gateway device and sending the acceptance notice d8 to the order placement gateway device 40.

In addition, the stock exchange apparatus 50 has a function of crossing orders from a plurality of participants, and returning a result of a trade that has reached an agreement, and a function of sending, to the participants, the market information indicating the state of the trade.

The parent order storage device 60 is a storage device which can be read by the basket management devices 20A and 20B and which is written by the basket management device 20B of the slave system. For example, the parent order registration telegram d1 is stored in the parent order storage device 60.

The child order storage device 70 is a storage device which can be read by the basket management devices 20A and 20B and which is written by the basket management device 20B of the slave system. For example, the child order telegram d2 and placed order information are stored in the child order storage device 70.

The parent order storage device 60 and the child order storage device 70 may be different storage areas of one storage device, and may be relational databases. The parent order storage device 60 and the child order storage device 70 may also be referred to as databases.

Now, the operation of the securities trading system having the above-described configuration is described with reference to the schematic diagrams in FIG. 12 to FIG. 15.

The operation of sharing the parent order and the child order is first described with reference to FIG. 12.

The OMS device 10 sends the parent order registration telegram d1 created in response to the user operation to the basket management device 20A of the master system.

In the basket management device 20A of the master system, the OMS connection units 22A and 22B write the received parent order registration telegram d1 into the storage units 21A and 21B.

Furthermore, in the basket management device 20A of the master system, the order agreement management unit 23A creates the child order telegram d2 for placing divided orders of the trade and quantity in the parent order registration telegram d1 written in the storage unit 21A in accordance with the format of the stock exchange so that the sections of the quantity, the price, and the execution conditions are left blank. The child order telegram d2 is also written into the storage units 21A and 21B. The order agreement management unit 23A sends, to the child order management device 30A of the master system, the parent order registration telegram d1 and the child order telegram d2 written in the storage unit 21A. The child order management device 30A of the master system writes, into the storage units 31A and 31B, the parent order registration telegram d1 and the child order telegram d2 received by the child order management unit 33A.

The order sharing unit 24A of the basket management device 20A of the master system sends, to the basket management device 20B of the slave system, the parent order registration telegram d1 and the child order telegram d2 written in the storage unit 21A.

In the basket management device 20B of the slave system, the order agreement management unit 23B writes, into the storage unit 21B and the external order storage devices 60 and 70, the parent order registration telegram d1 and the child order telegram d2 received via the order sharing unit 24B.

In the basket management device 20B of the slave system, the OMS connection unit 22B sends back the acknowledgment ACK of the parent order registration telegram to the OMS device 10 at the completion of the writing by the order agreement management unit 23.

Thus, as shown in FIG. 12, the parent order registration telegram d1 and the child order telegram d2 are shared among the devices 20A, 20B, 30A, 60, and 70 synchronized with one another by a sharing operation that places great importance on availability.

Furthermore, the order placement operation after the order sharing operation is described with reference to FIG. 13.

In the child order management device 30A of the master system, the CEP unit 32A receives the market information d3 from the stock exchange apparatus 50, and calculates statistics in accordance with the market information d3. Although not shown, in the child order management device 30B of the slave system as well, the CEP unit 32B receives the market information d3 from the stock exchange apparatus 50, and calculates statistics in accordance with the market information d3, in order to prepare for a later-described high-speed recovery operation.

Now, in the child order management device 30A of the master system, the child order management unit 33A creates the trigger set in accordance with the parent order registration telegram d1 and the child order telegram d2 in the storage units 31A and 31B, and sends this trigger set d4 to the CEP unit 32A.

The CEP unit 32A of the child order management device 30A of the master system judges whether to place an order with the stock exchange apparatus 50 in accordance with whether the calculated statistics and the trigger set d4 sent from the child order management unit 33A in the case of the master system correspond to the market information.

When an order is placed as a result of the judgment, the CEP unit 32A creates the order placement trigger d5 in accordance with the market information used in the judgment and the trigger set d4, and sends the order placement trigger d5 to the child order management unit 33A.

The child order management unit 33A of the child order management device 30A of the master system sets, in the child order telegram d2, the quantity, the price, and the execution condition included in the order placement trigger d5 and thereby creates an order telegram d6, and sends the order telegram d6 to the stock exchange connection unit 34A.

The stock exchange connection unit 34A of the child order management device 30A of the master system sends the order telegram d6 to the stock exchange apparatus 50 via the order placement gateway device 40.

Thus, in the child order management device 30A of the master system, the CEP unit 32A judges the order placement, and the child order management unit 33A creates the order telegram d6. This configuration enables the operation that places great importance on high-speed performance.

The stock exchange apparatus 50 performs securities trading processing in accordance with the received order telegram d6, and sends the acceptance notice d8 to the order placement gateway device 40. The order placement gateway device 40 creates, from the received acceptance notice d8, the acceptance notice d9 transmitted from the order placement gateway device 40, and sends the acceptance notice d9 to the child order management device 30A of the master system and the basket management devices 20A and 20B.

In the child order management device 30A of the master system, the stock exchange connection unit 34A writes the received acceptance notice d9 into the storage units 31A and 31B.

When the order agreement management units 23A and 23B receive an acceptance notice d9 including the child order ID, the basket management devices 20A and 20B retrieve the child order telegram d2 including the child order ID from the storage units 21A and 21B, and then set the acceptance notice reception flag (not shown) in the child order telegram d2. The order agreement management unit 23B of the slave system also retrieves the child order telegram d2 including the child order ID from the external child order storage device 70, and then sets the acceptance notice reception flag in the obtained child order telegram d2.

Now, the recovery operation after the order placement operation is described with reference to FIG. 14.

Suppose that a failure has just occurred in the child order management device 30A of the master system.

Suppose that in the basket management device 20A of the master system, the order agreement management unit 23A has detected the failure in the child order management device 30A of the master system, for example, after sending the parent order registration telegram d1 and the child order telegram d2 to the child order management device 30A of the master system.

At the time of the failure detection, the order agreement management unit 23A of the basket management device 20A of the master system sends, to the child order management device 30B of the slave system, the parent order registration telegram d1 and the child order telegram d2 in the storage units 21A and 21B to switch the child order management device 30B of the slave system to the master system.

For example, the order agreement management unit 23A of the basket management device 20A of the master system sends, to the child order management device 30B of the slave system, the child order telegram d2 in which the acceptance notice reception flag based on the acceptance notice d9 is not set, and the parent order registration telegram d1 including the child order ID in the child order telegram d2, out of the parent order registration telegram d1 and the child order telegram d2 in the storage units 21A and 21B.

On receipt of the child order telegram d2 and the parent order registration telegram d1, the child order management device 30B of the slave system is switched to the master system from the state of calculating the above-mentioned statistics.

The child order management device 30B switched to the master system continues the operation similar to the above-mentioned order placement operation.

If a failure also occurs in the basket management device 20A of the master system in this recovery operation, the order agreement management unit 23A of the basket management device 20B of the slave system sends the parent order registration telegram d1 and the child order telegram d2 in the storage units 21A and 21B to the child order management device 30B to switch the child order management device 30B of the slave system to the master system and thereby recovers the order placement operation in the same manner as described above, as shown in FIG. 15.

As described above, according to the present embodiment, the basket management devices 20A and 20B of the master system and the slave system and the child order management devices 30A and 30B of the master system and the slave system are provided. This configuration enables the availability in securities trading. In the child order management device 30A of the master system, the CEP unit 32A for judging an order placement is separate from the child order management unit 33A for creating an order telegram. This configuration enables the high-speed performance in securities trading.

Therefore, according to the present embodiment, it is possible to achieve both the availability and high-speed performance in securities trading.

In addition, in general, the CEP server (corresponding to the CEP unit 32A) often performs algorithm trading to event-receive market information and judge order placement. However, even when a failure occurs, it is necessary to continue the judgment of the order placement by the event reception on the standby side (corresponding to the slave system). In some types of algorithm trading, order placement is judged by receiving market information from the opening of the stock exchange of the day and thereby performing statistical calculation such as the RSI. It is thus necessary to receive the market information by a plurality of CEP servers and perform the statistical calculation, and hold the latest statistics in the CEP servers. In order to differentially receive the market information, it is also necessary for the CEP servers to receive the latest market values.

In contrast, according to the present embodiment, the market information is received by the CEP units 32A and 32B of the master system and the slave system. In the event of the failure detection, the child order telegram d2 (and its parent order registration telegram d1) of the CEP unit 32A of the master system to be ordered is sent to the basket management device 20B of the slave system from the basket management device 20A of the master system. As a result, the CEP unit 32B of the slave system is promoted to the master system. Thus, the CEP unit 32B changed to the master system can continue the judgment of the order placement in accordance with the latest market information and statistics. All market information may be received by an unshown securities company site apparatus and held in a memory as market history so that the latest market information can be recovered from the market history in the memory even when a failure has also occurred in the CEP unit 32B of the slave system.

Moreover, according to the present embodiment, the CEP unit 32A having the CEP server function for judging order placement by market information is separate from the child order management unit 33A having the child order management function, and the CEP unit 32A is specialized in the judgment of order placement. The child order management unit 33A manages the child order telegram d2 in the telegram format of the stock exchange (the format of the stock exchange), and sets a price and quantity in the child order telegram d2 in accordance with the timing of the reception of the order placement trigger d5 from the CEP unit 32A and then immediately sends the market information d3 to the order placement gateway device 40 for the execution in the stock exchange. This enables high-speed performance (low latency). An event processing engine of a desired vendor can be used to perform the function of judging the order placement trigger d5. The same message format is used for the order telegrams d2, d3, and d4 regardless of the event processing engine and the algorithm to be written. As a result, the child order management unit 33A can send the market information d3 to the order placement gateway device 40 regardless of the event processing engine and the algorithm logic. In addition, the order placement gateway device 40 directly sends the order telegram d6 to the stock exchange apparatus 50 without the intervention of the OMS. It is thus possible to further improve high-speed performance.

Furthermore, according to the present embodiment, the parent order registration telegram d1 is held not only in the child order management device 30A of the master system but also in the basket management devices 20A and 20B and the parent order storage device 60. Thus, the operation is continued by the basket management devices 20A and 20B in the event of failures in the order storage devices 60 and 70. In the event of a failure in one of the basket management devices 20A and 20B, the operation is continued by the other of the basket management devices 20A and 20B. In the event of failures in both the basket management devices 20A and 20B, the operation is continued by the parent order registration telegram d1 and the child order telegram d2 in the order storage devices 60 and 70. It is also possible to change the basket management devices 20A and 20B to a triple configuration.

According to the present embodiment, the basket management device 20B of the slave system holds the parent order registration telegram d1 and the child order telegram d2 received from the basket management device 20A of the master system and then sends the acknowledgment ACK to the OMS device 10. This can ensure the order sharing operation in the basket management device 20B of the slave system. As the basket management device 20B of the slave system writes the parent order registration telegram d1 and the child order telegram d2 into the order storage devices 60 and 70, the load can be dispersed to the basket management device 20A of the master system.

According to the present embodiment, the basket management device 20A of the master system creates the child order telegram d2 in accordance with the format of the stock exchange so that the sections of the quantity, the price, and the execution conditions are left blank (unset). Therefore, the load of editing the market information d3 at the time of order placement is reduced, and the response time can be reduced accordingly. Moreover, high-speed performance is also improved by previously creating a high-load telegram and later setting necessary information alone as well as by small amount of information for the trigger set d4 and the order placement trigger d5.

According to the present embodiment, the child order management device 30A of the master system and the basket management devices 20A and 20B manage placed orders by the use an acceptance notice reception flag based on the acceptance notice d9 of the stock exchange. It is therefore possible to prevent missing orders and double ordering, and ensure the management of unexecuted orders. Accordingly, in the event of a failure detected in the child order management device 30A of the master system, the basket management device 20A of the master system can send the unexecuted child order telegram d2 to the child order management device 30B of the slave system. The child order management devices 30A and 30B of the master system and the slave system obtain market information and calculate statistics, so that the latest condition is always maintained whether the data source to be the material for the judgment of order placement is the master system or the slave system. When promoted to the master system, the child order management device 30B of the slave system starts the judgment of the order placement by the latest value of the market information. At the same time, the acceptance notice reception flag in the child order telegram can be checked to prevent double ordering and missing orders.

Furthermore, according to the present embodiment, it is possible to provide an algorithm foundation that satisfies both the above-mentioned availability and high-speed performance. A product of a desired vendor can be used in an algorithm engine. As the product of the desired vendor can be easily incorporated, the algorithm logic can be incorporated by algorithm constructing means selected by a user, and an algorithm anticipated by a trader can be easily packaged.

The method described in the embodiment can also be stored in a storage medium such as a magnetic disk (Floppy™ disk, hard disk, or the like), an optical disk (CD-ROM, DVD, or the like), a magneto-optical disk (MO), or a semiconductor memory as a program which can be executed by a computer and distributed.

As the storage medium, any configuration which is a computer-readable storage medium in which a program can be stored may be used regardless of a storage format.

An OS (operating system) which operates on a computer on the basis of an instruction of a program installed from the storage medium in the computer, database management software, and MW (middleware) such as network software may execute a part of the processes to realize the embodiment.

Furthermore, the storage medium according to the present invention includes not only a medium independent of a computer but also a storage medium in which a program transmitted through a LAN, the Internet, or the like is downloaded and stored or temporarily stored.

The number of storage media is not limited to one. A case in which the process in the embodiment is executed from a plurality of media is included in the storage medium according to the present invention. Any medium configuration may be used.

A computer according to the present invention is to execute the processes in the embodiments on the basis of the program stored in a storage medium. The computer may have any configuration such as one apparatus constituted by a personal computer or a system in which a plurality of apparatuses are connected by a network.

A computer in each embodiment includes not only a personal computer but also an arithmetic processing apparatus, a microcomputer, or the like included in an information processing apparatus. The computer is a generic name of an apparatus and a device which can realize the functions of the present invention by a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A securities trading system comprising a plurality of order sharing devices and a plurality of ordering devices which are configured to communicate with each other, the order sharing devices being switchable between a master system and a slave system and having a first storage unit, the ordering devices being switchable between a master system and a slave system and having a second storage unit, the order sharing device of the master system comprises:
- a module which writes, into the first storage unit, a parent order telegram received from a parent order registration device;
- a child order creating module which writes, into the first storage unit, a child order telegram created from the parent order telegram;
- a module which sends each telegram in the first storage unit to the ordering device of the master system and the order sharing device of the slave system; and
- a switch module which sends each of the telegrams to the ordering device of the slave system to switch from the slave system to the master system when a failure is detected in the ordering device of the master system; and the ordering device comprises:
- a module which writes each of the sent telegrams into the second storage unit;
- a module which calculates statistics from market information received from a stock exchange apparatus in the case of the master system and the slave system; and
- a judging module which judges by the statistics whether to permit an order placement with the stock exchange apparatus in the case of the master system;
- wherein the ordering device of the slave system is switched to the master system from a state of calculating the statistics when each of the sent telegrams is received by the ordering device of the slave system, and
- the ordering device switched to the master system continues a judgment of the order placement in accordance with a latest market information and statistics.

2. The ordering device used in the securities trading system according to claim 1, comprising:
- a module which creates a trigger set that indicates conditions to permit the order placement in accordance with the parent order telegram and the child order telegram in the second storage unit, and sends this trigger set;
- a module provided in the judging module, which judges whether to permit the order placement in accordance with whether the calculated statistics and the sent trigger set correspond to the market information;
- a module which creates a child order ID and an order placement trigger including order placement contents specific to the child order in accordance with the market information used in the judgment when the order placement is permitted as a result of the judgment, and sends this order placement trigger;
- a module which sets, in the child order telegram, the order placement contents included in the sent order placement trigger, and then creates an order telegram; and
- a module which sends this order telegram to the stock exchange apparatus,
- wherein the child order telegram includes the child order ID and an order telegram model, and
- the order telegram model is created in accordance with a format of a stock exchange to which the stock exchange apparatus belongs, and in the format of the stock exchange to which the stock exchange apparatus belongs, the same data as the data in the parent order telegram are already set, and the order placement contents are unset.

3. The order sharing device used in the securities trading system according to claim 1, comprising:
- a module which writes, into the first storage unit and an external order storage device, the parent order telegram and the child order telegram received from the order sharing device of the master system, in the case of the slave system; and
- a module which returns an acknowledgment of the parent order telegram to the parent order registration device at the completion of the writing.

4. The order sharing device used in the securities trading system according to claim 1, wherein
- the child order creating module includes
- a module which uniquely creates the child order ID to be included in the child order telegram during the creation of the child order telegram; and
- a module which creates an order telegram model to be included in the child order telegram in accordance with a format of a stock exchange to which the stock exchange apparatus belongs during the creation of the child order telegram; and
- the order telegram model is configured so that in the format of the stock exchange, the same data as the data in the parent order telegram are already set, and order placement contents specific to the child order are unset.

5. The order sharing device used in the securities trading system according to claim 1, comprising:
- a module which retrieves a child order telegram including the child order ID from the storage unit and then sets an acceptance notice reception flag in the child order telegram when receiving an acceptance notice including the child order ID from the stock exchange apparatus; and
- a module which also retrieves a child order telegram including the child order ID from the external order storage device and then sets the acceptance notice reception flag in the child order telegram when receiving an acceptance notice including the child order ID from the stock exchange apparatus;
- wherein the switching module sends, to the ordering device of the slave system, the child order telegram in which the acceptance notice reception flag is not set, and the parent order telegram including the child order ID in the child order telegram, out of the parent order telegram and the child order telegram in the first storage unit.

* * * * *